Dec. 29, 1964   W. D. HUSTON   3,163,046
PRESSURE GAUGE
Filed Oct. 31, 1962   3 Sheets-Sheet 1

INVENTOR.
WILLIAM D. HUSTON
BY *Wishlinger*
Attorney

Dec. 29, 1964 W. D. HUSTON 3,163,046
PRESSURE GAUGE
Filed Oct. 31, 1962 3 Sheets-Sheet 2
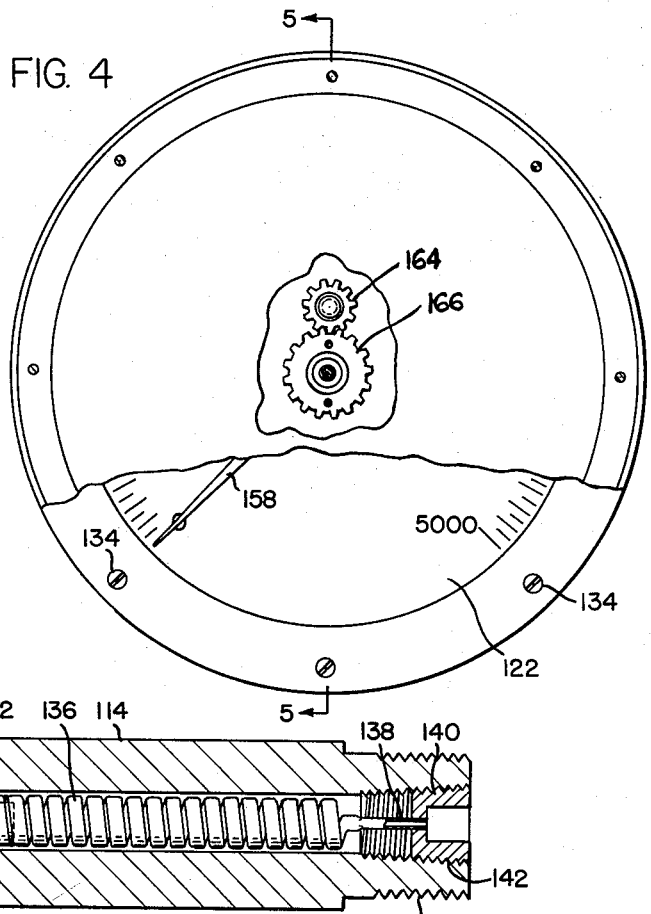
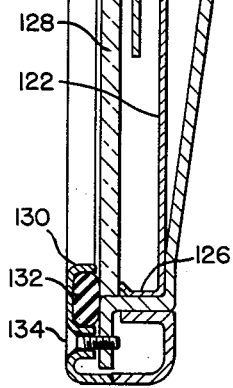
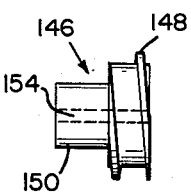
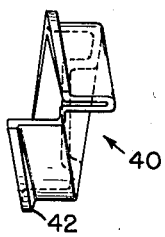
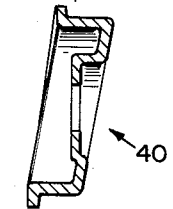
INVENTOR.
WILLIAM D. HUSTON
BY
Attorney Dec. 29, 1964 W. D. HUSTON 3,163,046
PRESSURE GAUGE
Filed Oct. 31, 1962 3 Sheets-Sheet 3

INVENTOR.
WILLIAM D. HUSTON
BY
Attorney

United States Patent Office 3,163,046
Patented Dec. 29, 1964

3,163,046
PRESSURE GAUGE
William D. Huston, 98 Dansbury Circle S.,
Rochester, N.Y.
Filed Oct. 31, 1962, Ser. No. 235,905
17 Claims. (Cl. 73—418)

The present invention relates to gauges, and more particularly to a helical Bourdon tube pressure gauge of the type disclosed in my copending application Serial No. 850,317, filed November 2, 1959, now abandoned and of which this application constitutes a continuation-in-part. Specifically this invention relates to a high pressure helical Bourdon tube gauge, provided with means for adjusting the deflection rate of the Bourdon helix to match the arc of the graduations on the indicating dial of the gauge.

In conventional Bourdon tube gauges, the motion of the Bourdon tube is transferred to a lever or a gear movement, and the lever, or segment of the gear movement, is usually provided with an adjustable crank arm to change the leverage ratio between the Bourdon tube and the pointer to match the dial arc. Where helical Bourdon coils have relatively large diameter convolutions, for example one inch across the diameter of the helix, the length of the helix has been adjusted to match a dial arc, a recorder chart, or a controller action by using radial arms, mechanical clamps, and soldered tabs. The addition of extra crank arms, links, and levers, complicates the Bourdon gauge mechanism. Because the helical Bourdon coil is fragile, and the tube is sealed at one end, there is no possibility of the obvious solution of welding a stem on the tube at the proper coil length in order to match a given dial arc.

Furthermore, the compact size of an extremely small diameter Bourdon helical coil, with inside diameters of from one-eighth of an inch to three-eighths of an inch, for example, prevents the use of any bulky mechanical clamp on the Bourdon tube as an adjustment for the proper deflection. Also, such a bulky and massive adjustment device would reduce the mechanical stability of the coil because of the relative dimensions, and the light spring rate of a small diameter coil. If the device for adjusting the deflection rate of the Bourdon helix is too heavy or large, the Bourdon coil will be unable to be supported adequately to obtain a stable and steady calibration under conditions of vibration and shock.

One object of this invention is to provide a gauge having a helical actuating member with improved means for adjusting the deflection rate of said member.

Another object of the invention is to provide a gauge of the character described which is capable of calibration so that it will be stable and steady under conditions of vibration and shock.

Another object of the present invention is to provide a helical Bourdon tube pressure gauge with improved means for calibrating it.

A still further object of this invention is to provide a helical Bourdon tube pressure gauge which is simple in construction, economical to manufacture, and reliable in operation.

Other objects of this invention will become apparent from the drawings, the specification, and the appended claims.

In the drawings:

FIG. 4 is a side elevation with parts broken away of a gauge constructed according to another embodiment of this invention;

FIG. 5 is an axial section of this modified gauge taken at line 5—5 of FIG. 4 and looking in the direction of the arrows;

FIG. 6 is an elevation on an enlarged scale showing the adjustment member of the gauge of FIG. 5;

FIG. 7 is a side elevation of the adjustment member illustrated in FIGS. 1 through 3;

FIG. 8 is an axial sectional view of the adjustment member shown in FIG. 7;

Figure 1:
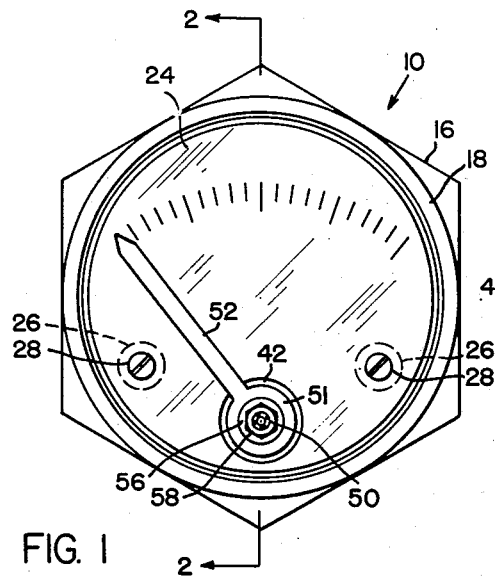
FIG. 1 is a side elevation of a gauge constructed according to one embodiment of this invention.

In the embodiments of the invention herein illustrated, a helically wound Bourdon tube having many turns and of relatively small diameter constitutes the actuating member of the gauge. Its open end is connectable to a source of pressure. For adjusting the deflection rate of the Bourdon tube, a member having internal or external threads is adjustably threaded onto the upper end of the tube helix. A pointer is connected to this member to transmit the motion from the coil and to register against the indicating dial of the gauge. The root diameters of these internally and externally threaded members, respectively, are less than, and greater than, respectively, the root diameter of the Bourdon helix when the Bourdon helix is under its maximum working pressure and expanded to its largest diameter; and in practice, the lead of the thread of an adjustment member may be made smaller than the lead of the Bourdon helix in order to lock it tightly against the turns of the helical coil.

Referring to the embodiment shown in FIGS. 1 through 3, 10 denotes the gauge case or housing. This housing is provided with a base portion 12 having an axially extending cylindrical stem portion 14, and an internally threaded flange 16 formed integrally therewith. A cylindrical casing 18 is threaded at one end 20 into the flange portion 16 of the base member 12. A glass cover 22 closes the other end of the member 18. A graduated dial 24 is mounted within the casing 18 on top of axially extending spacing members 26 which space the dial above base 12. The dial is secured to the spacers by screws 28.

A helically-wound Bourdon tube 30 is mounted in the gauge housing 10 with its open end connected to and in communication with bore 32 of the stem 14. The tube surrounds a cylindrical member 34 which is of slightly smaller diameter than the diameter of the tube helix. An axially extending guide pin 36 is attached to the member 34 at its inner end.

Adjustably threaded in the helix of the Bourdon tube adjacent the closed end of the tube is a member 40 (FIGS. 2, 3, 7 and 8) which may be either stamped or molded from plastic, such as nylon, or Teflon, or may be made of die cast metal. The member 40, which is used to adjust the deflection rate of the tube, has a helical flange 42 which threads between the convolutions of the Bourdon tube. The member 40 has an internal flange 44, which lies in a plane perpendicular to the axis of the helically wound tube 30. The annular wall of the member terminates at at least one end of the member in a straight, axially extending edge 57 (FIG. 7) which marks the effective length of the helical tube 30 when the member is threaded thereon. Attached to the flange 44 is a block 46 having a portion of reduced diameter which extends through a central opening of the flange 44 and is peened against the undersurface thereof to securely hold the block 46 in position. The block 46 has a guide hole 48 in which the pin 36 extends. When the member 40 is threaded in the tube, the pin 36 therefor centers and guides this member. The block 46 has a threaded stem 50 of lesser diameter around which the eye 51 of a pointer 52 fits. This pointer seats against a shoulder 54 on the block 46. A washer 56 fits over the threaded stem 50 against the eye 51. A nut 58 threads on the stem 50 to secure the pointer 52 in position against the shoulder 54 of the block 46.

In constructing this gauge a Bourdon coil for a particular pressure range and a particular dial arc is wound to give a deflection rate that will move the pointer 52 beyond the total range of the dial arc. To calibrate the gauge the member 40 is then threaded into the end of the Bourdon coil and the coil is tested against the dial. If the total movement of the pointer, when a desired range of pressure is applied to the coil, does not match the graduated arc of the dial exactly, the member 40 is threaded in or out of the helix until the pointer travel exactly matches the dial arc to give a true calibration. After final adjustment, the member 40 may be permanently sealed to the helix with an adhesive or by soldering. In some applications, as noted above, the thread lead of the member 40 may be made to fit the helical turns of the Bourdon tube tight enough so that no external means for sealing the member to the Bourdon helix is required.

Referring to the embodiment of the invention shown in FIGS. 4 and 5, 110 denotes the gauge. This form of gauge is particularly adaptable for pressure ranges of wide variation. The gauge comprises a casing 112 which has attached thereto an axially extending hollow stem portion 114. The member 114 has a portion 116 of reduced diameter extending into the casing 112 and a threaded portion 118 which is adapted to be connected to a source of pressure which is to be measured. Mounted in the casing 112 and rotatable about the periphery of the portion 116 of the stem 114 is a dial 122. The dial is mounted to be rotatably adjustable on a bushing 124 which is secured in portion 116 of the stem 114. The dial 122 has a flanged portion 126 at its periphery which slidably engages the internal surface of the casing 112, so that the dial may be rotatably adjusted as hereinafter mentioned.

Spaced from the dial 122 and engaging the edge of the flange 126 is the glass cover 128 for the casing 112. A bezel 130 having a resilient annular gasket 132 is fastened on the casing 112 and the glass 128 by screws 134.

A helically wound Bourdon tube 136 is mounted in the hollow stem 114 and has at its open end an axially extending portion 138 which is attached to a bushing 140 that is threaded in the hollow stem.

For adjusting the deflection rate of the tube an adjustable member 146 is provided which has a helical surface 148 (FIG. 6) formed on the exterior thereof. This member is threaded in the helix of the Bourdon tube 136 adjacent the closed end of the tube. The member 146 has a portion 150 of lesser diameter which is adapted to rigidly support an axially extending shaft 152 which is fixedly secured in bore 154 of the member 146. The shaft 152 centers in the guide bushing 124. A pointer 158 is rigidly mounted on the end of the shaft 152 to read against the graduations on the dial 122.

A stud 160 is rotatably mounted in a bushing 162 which is fastened in the casing 112. This stud has a gear 164 rigidly attached thereto which meshes with a gear 166, that is coaxially secured to the dial 122. This permits the dial 122 to be rotated relative to the pointer 158 so that when the pointer is in the zero position, the dial reads zero.

Figure 3:
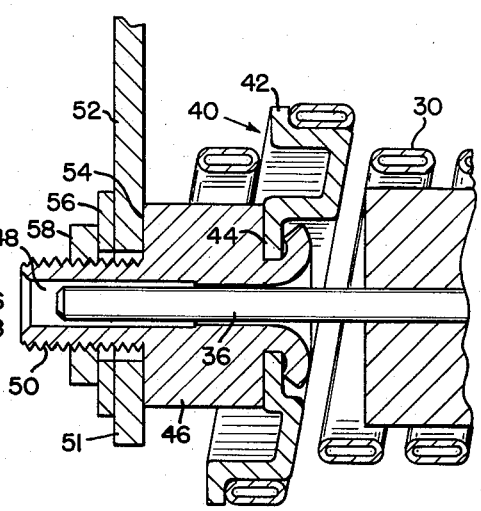
FIG. 3 is a fragmentary axial section through the gauge illustrating on an enlarged scale the means for adjusting the deflection rate of the gauge.
Figure 2:
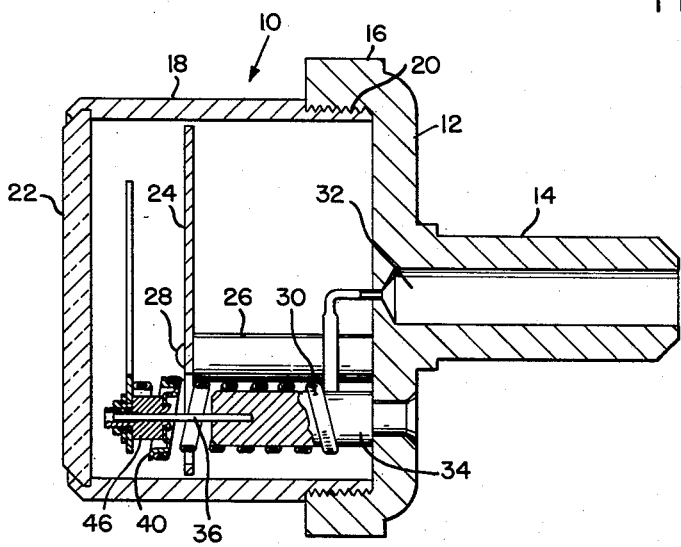
FIG. 2 is an axial section through the pressure gauge of FIG. 1 taken at line 2—2 of FIG. 1 and looking in the direction of the arrows.

Similar to the embodiment in FIGS. 1 through 3, the Bourdon coil 136 is wound initially to have a deflection that will move the pointer 158 beyond the total range of the dial graduations. To adjust the deflection, the member 146 is adjustably threaded into the Bourdon coil adjacent its closed end. Like the embodiment shown in FIGS. 1 through 3, if the deflection of the tube is not matched exactly with the dial, the member 146 is threaded in or out of the helix until the pointer travel exactly matches the dial arc. After final adjustment the member 146 may be permanently secured to the tube by adhesive or otherwise.

By providing an adjustment nut, such as 40 or 146, and by guiding the pointer bushing 46 or the pointer stem 152 which is attached to this nut, the torque output of the Bourdon helix is somewhat greater than the torque output of an unguided free coil. The reason for this is that in a free Bourdon helix where the closed end of the tube is disposed radially of the axis of the tube to act as a pointer, or actuate a lever or gear mechanism that operates the pointer, the pointer can flex as a cantilever spring in line with the axis of the helix, and as a torsion spring rotating about the axis of the helix. For springs with many turns, for example, six turns total, the cantilever spring rate is considerably less than the torsion spring rate; and if the helical coil is extended to fifteen, twenty or thirty turns, for example, the spring rate of the coil as a cantilever is a very great deal less than the spring rate in torsion. Thus, if the center of the Bourdon coil is not guided, and the closed end of the Bourdon tube is free to flex in line with the axis of the tube, the stability of the pointer and the energy output of the pointer with change in applied pressure will be considerably less than with the construction herein disclosed. Thus, it is apparent that as the member 40 or 146, respectively, carries its respective pointer bearing or pointer, the energy output at the pointer is dependent upon the spring rate in torsion and not reduced by the spring rate as a cantilever.

Figure 9:
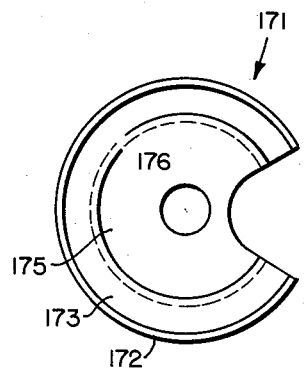
FIG. 9 is a front elevation of a further modified form of adjustment member.
Figure 10:
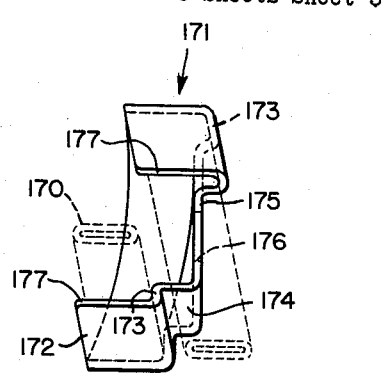
FIG. 10 is a side elevation of the adjustment member shown in FIG. 9, and illustrating in phantom, by broken lines, part of the helical Bourdon tube upon which the member is adapted to be threaded.

It is apparent that the member 40 and the member 146 may be interchangeable in the embodiments of the gauge shown herein; and members similar to 40 and 146 may be constructed with internal instead of external threads. FIGS. 9 and 10, for instance, illustrate an adjustment member 171, which is similar to member 40, but which is made of sheet metal and is adapted to be threaded onto the exterior rather than into the interior of a helically wound Bourdon tube 170, similar to tubes 30 and 136. Member 171 has a helical wall portion 172, constituting part only of a helical convolution, and which is of a diameter to surround and closely engage the exterior of the tube 170. Wall 172 has an inwardly projecting helical rib 173 that is adapted to thread between the convolutions of tube 172, and a transverse flange 175 which is connected to rib 173 by a web portion 174, and which has a central opening 176 therethrough to accommodate a bushing of the type shown at 46 in FIGS. 1 to 3. The terminal lateral edges 177 of the wall 172 are flat and extend in axial direction, and may be employed to determine the effective tube length of tube 170 as does the edge 57 of member 40.

Figure 12:
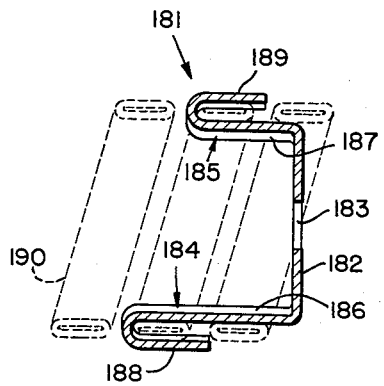
FIG. 12 is a front elevation of the member shown in FIG. 11, and illustrating in phantom, by broken lines, part of the helical Bourdon tube upon which the member is adapted to be threaded.
Figure 11:
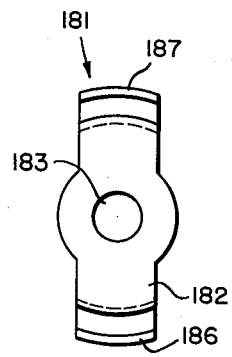
FIG. 11 is a front elevation of still another type of adjustment member adapted to be employed in gauges of the type described.

FIGS. 11 and 12 show an even further modified adjustment member 181 which is particularly adaptable to gauges of larger diameter when the weight of a solid adjustment bushing would be a disadvantage. The bushing 181 is a light, skeleton-type member made of sheet metal and having a flat center portion 182 with a circular opening 183 therethrough for accommodating a centering pin such as 152 in FIG. 5. Integral with the portion 182, and equi-radially spaced from opening 183, are two, diametrally opposite, and axially extending U-shaped gripping sections 184 and 185. Portion 184 has a longer inside leg portion 186 than the inside leg 187 of wall portion 185, as shown in FIG. 12, but the outside legs 188 and 189, respectively, of the two gripping segments are of substantially the same height and are formed concentrically with the inner legs and radially spaced therefrom. The two U-shaped portions are in effect part convolutions of the same helix; and member 181 is adapted to be adjustably threaded onto a helical tube 190 as shown in FIG. 12, so that diametrally opposite portions of at least one convolution of the tube will be gripped by the opposed inside faces of the portions 184 and 185. The effective helical pitch of member 181 will, of course, be a function of the difference of the height in the U-portions 184 and 185; and the legs 186, 188 and 187, 189 may be made to embrace tube 190 with sufficient frictional engagement so that the member 181 need not be soldered or otherwise permanently fixed to tube T after its adjustment thereon.

Figure 13:
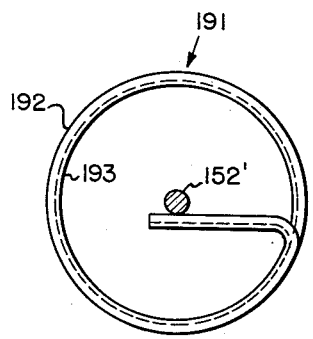
FIG. 13 is a front elevation of still a further type of adjustment member and the output shaft to which it is adapted to be secured.
Figure 14:
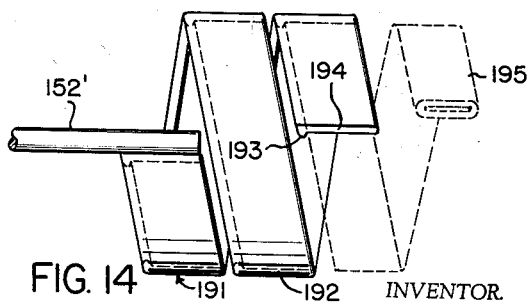
FIG. 14 is a side elevation of the member shown in FIG. 13, and illustrating in phantom, by broken lines, part of the helical Bourdon tube upon which it is adapted to be threaded.

The modified adjustment bushing 191 in FIGS. 13 and 14 consists of a narrow helically wound strip 192 of flat, solid, wire having along one longitudinal edge thereof a radially inwardly projecting helical rib 193. The member 191 may be of one or more convolutions, and is adapted to be threaded about the exterior of helical tube 195 as shown in FIG. 14. It is preferably sheared off square at one end and straight in line with the axis of the Bourdon coil 195 to provide a flat, axially extending edge 194 at that end which acts as a sharp edge to fix the effective length of the coil 195. Thus edge 194 serves the same function as edge 57 in FIG. 7. The opposite end of strip 192 is bent inwardly and is soldered to a centering pin 152', similar to pin 152 in FIG. 5. When the member has been threaded into its adjusted position on one end of tube 195, any expansion and contraction of the tube will be imparted to pin 152'. Rib 193 obviously could be made to project radially outwardly from strip 194 if it were preferred to thread member 191 into rather than about the tube 195.

Thus, I have provided an improved helically-wound Bourdon tube pressure gauge having a simple adjustment for adjusting the deflection rate of the tube to match a given arc of dial graduations. Furthermore, this pressure gauge is stable, simple in its construction, and is able to be used over a wide variety of pressure ranges. Moreover, the ribs or flanges on the adjusting members disclosed herein define, in whole or in part, a helical thread which is satisfactory for adjustably threading the member onto a measuring element such as a helically coiled torsion spring, as well as the above-described Bourdon tubes. Regardless of the type of measuring element with which it is used, the adjusting member is secured to at least two diametrally opposite portions of a measuring element convolution along its inner or outer peripheral surface. This securing of the adjustment member to diametrally opposite points of a convolution, instead of to one side only thereof, eliminates any undesirable pivoting of the member transverse to the coil axis of the measuring element; and is particularly advantageous in the case of small diameter coils which are long and have a large number of convolutions. In the latter case, the adjustment member is effective, through the agency of a centering pin 152 or the like, to prevent any undesirable lateral flexing or bending of the coiled measuring element; and because the smaller diameter coils are not particularly stiff and strong, they do not tend unduly to flex or strain the diametrally opposite connections between the adjustment member and coiled measuring element.

Furthermore, while the invention has been described specifically as applied to a helical Bourdon tube gauge, it will be understood that adjustment members similar to the type disclosed herein may be used for calibrating other types of gauges or controls using helically wound actuating elements, as, for instance, thermometers employing helically wound bimetallic actuating elements. Also, while it is possible to employ the disclosed adjusting members on coiled tension springs to adjust the effective lengths thereof, the edge configurations of the disclosed adjusting members are particularly adapted for use with torsional measuring elements, wherein tangential contact between the adjustment member and one or more convolutions of the measuring element is important in order to maintain the member in axial alignment with the axis of the convolutions, and to impart rotation to the adjustment member upon the expansion or contraction of the convolutions.

While the invention has been described then in connection with a plurality of embodiments thereof, it will be understood that it is capable of even further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A pressure gauge comprising
   (a) a casing having a bore for connection to a source of pressure,
   (b) a Bourdon tube mounted in said casing and having a plurality of helical convolutions, said tube being closed at one end and open at its other end, the open end of said tube communicating with said bore,
   (c) a graduated dial mounted in said casing,
   (d) a member adjustably threaded on said tube convolutions adjacent the closed end of the tube and rotatable with the tube in response to the expansion or contraction of said convolutions,
   (e) a bushing rigidly attached to said member and having an axially extending opening therein,
   (f) a rod disposed coaxially in said tube and extending into said opening to retain said tube against lateral deflection, and
   (g) a pointer connected to said bushing and rotatable therewith to read against the graduations on said dial in accordance with the pressure in said tube.

2. A pressure gauge, comprising
   (a) a casing having a bore for connection to a source of pressure,
   (b) a Bourdon tube mounted in said casing and having a plurality of helical convolutions, said tube being closed at one end and open at its other end, the open end of said Bourdon tube being in communication with said bore,
   (c) a graduated dial mounted in said casing,
   (d) a member having a helical ridge formed on its periphery, the root diameter of said member being greater than the internal diameter of said tube convolutions when said tube is expanded to its largest diameter, said member being threadably adjustable on said tube convolutions adjacent the closed end of said tube and being rotatable with said tube in response to the expansion or contraction of said convolutions,
   (e) a shaft rigidly mounted on said member coaxially therewith,
   (f) a bushing mounted in said casing surrounding said shaft to retain said shaft against lateral deflection, and
   (g) a pointer connected to said shaft and rotatable therewith to read against the graduations on said dial in accordance with the pressure in said tube.

3. A pressure gauge, comprising
   (a) a casing having a bore for connection to a source of pressure,
   (b) a helical Bourdon tube mounted in said casing and having a plurality of convolutions, said tube being closed at one end and open at its other end, the open end of said tube being in communication with said bore, (c) a graduated dial mounted in said casing, (d) a first member adjustably threaded onto said tube adjacent the closed end of said tube to rotate about the axis of said convolutions upon the expansion or contraction of said tube, (e) said first member having a first portion thereof which has surface curved about said axis and engaging a peripheral surface of at least one of said convolutions at diametrally opposite points thereon, and a second portion projecting radially from the curved surface of said first portion and defining at least a segmental helical thread for threading said first member onto said convolutions, (f) means in said casing to guide and limit the lateral deflection of said tube, said means including (g) a second member connected to said first member for rotation therewith about said axis, and (h) a pointer connected to said second member to rotate therewith and read against the graduations on said dial in accordance with the pressure in said tube.

4. A pressure gauge as defined in claim 3 wherein the pitch of the helical thread defined by said second portion is slightly different from the pitch of the helical convolutions of said tube.

5. A pressure gauge as defined in claim 3 wherein said first portion of said first member comprises (a) an annular element positioned coaxially within said convolutions, and said second portion is (b) a continuous, helical rib projecting from the outer peripheral surface of said element and threaded between said convolutions, and (c) wherein said second member comprises a shaft secured at one end thereof in the bore in said annular element and rotatably journaled adjacent its opposite end in said casing.

6. A pressure gauge as defined in claim 3 wherein said first portion of said first member comprises (a) a segmental helical element having a segmental peripheral surface which engages the peripheral surface of said one convolution for more than 180°, and said second portion is (b) an integral rib projecting from said segmental peripheral surface and threaded between said convolutions, and having the same helical pitch as said element.

7. A pressure gauge as defined in claim 3 wherein said first portion of said first member comprises (a) a helically wound metal strap having a plurality of convolutions and engaging a corresponding plurality of said tube convolutions, and said second portion is (b) an integral, helical rib projecting from said strap intermediate the ends of the strap and threaded between said tube convolutions, (c) said strap having one end thereof bent laterally inwardly of said tube convolutions and secured to one end of said second member.

8. A pressure gauge as defined in claim 3 wherein said first portion of said first member comprises (a) a generally U-shaped element mounted on said convolutions with its two, parallel leg portions extending parallel to said axis and engaging along their length the peripheral surface of said convolutions at substantially diametrally opposite points thereon, (b) one of said two leg portions being longer than the other, and (c) each of said leg portions being curved about said axis to conform to said peripheral surface of said convolutions, and (d) said second portion is a flange on the free end of each of said leg portions, and (e) said flanges project outwardly from each leg and define diametrally opposite segments of a helix the pitch of which is equal to the axial distance between the free ends of said two legs.

9. A pressure gauge, comprising (a) a casing, (b) a helical Bourdon tube mounted in said casing and wound in a plurality of convolutions and closed at one end and open at its other end, the open end of said Bourdon tube being connectable to a source of pressure, (c) a graduated dial mounted in said casing, (d) a member having a continuous, external, helical thread whose lead is smaller than the lead of said tube, said member being adjustably threaded on said tube adjacent the closed end of said tube to be rotatable with the tube, and (e) a pointer connected to said member to be movable upon movement of said member, and positioned to read against the graduations on said dial.

10. A pressure gauge, comprising (a) a casing (b) a helical Bourdon tube mounted in said casing and wound in a plurality of convolutions and closed at one end and open at its other end, the open end of said tube being connectable to a source of pressure, (c) a graduated dial mounted in said casing, (d) a helically-threaded member having a helical thread portion the root diameter of which is different from the inside diameter of the convolutions of said tube, when the latter is expanded to its largest diameter, said member being adjustably threaded on said tube convolutions adjacent the closed end of said tube with said helical thread portion extending between adjacent convolutions of said tube, and having a body portion frictionally engaging diametrally opposite portions of at least one convolution of said tube at all times to be rotatable with said tube upon the expansion or contraction thereof, and (e) a pointer connected to said member and rotatable upon rotation of said member and positioned to read against the graduations on said dial.

11. A pressure gauge according to claim 10 wherein (a) said body portion of said member is disposed within said tube convolutions, and (b) the last-named portion has a diameter larger than the internal diameter of the convolutions of said tube.

12. A pressure gauge, comprising (a) a casing (b) a Bourdon tube mounted in said casing and having a plurality of helical convolutions, said tube being closed at one end and open at its other end, the open end of said tube being connectable to a source of pressure, (c) a graduated dial mounted in said casing, (d) a member having a helical thread portion on its periphery adjustably threaded on said tube convolutions adjacent the closed end of said tube and a body portion having a curved surface frictionally engaging at least two diametrally opposite portions of said convolutions at all times, to be rotatable with the tube upon the expansion or contraction of said tube, (e) a second member mounted coaxially within the first-named member to guide and limit the lateral deflection of said tube, and (f) a pointer connected to said first-named member to read against the graduations on said dial.

13. An indicating device comprising (a) a helical condition-responsive member wound in a plurality of convolutions, and having a fixed end and a free end, said free end being rotatable coaxially of said convolutions relative to said fixed end in response to a change in the condition which is to be indicated, (b) a rigid member having a helical thread portion threaded onto said helical member adjacent the free end thereof and a body portion frictionally engaging at all times at least one convolution of said helical member at diametrally opposite points thereon to be rotatable with said free end, (c) means connected to said rigid member to limit the lateral deflection of said helical member, and (d) indicating means connected to said rigid member to indicate said change.

14. An indicating device comprising (a) a casing, (b) a helical condition-responsive member wound in a plurality of convolutions and having one end thereof fixed to said casing and the other end free to rotate coaxially of said convolutions relative to said casing in response to a change in the condition which is to be indicated, (c) a rigid member adjustably threaded onto said helical member adjacent said free end to rotate therewith, (d) said rigid member having a first portion thereof frictionally engaging at all times diametrally opposite sides of a peripheral surface on at least one convolution of said helical member, and having a second portion forming at least part of a helical thread on said first portion and threaded frictionally between the convolutions of said helical member, and (e) a third member journaled in said casing and connected to said rigid member for rotation therewith to indicate said change and to limit the lateral deflection of said helical member.

15. An indicating device comprising (a) a casing (b) a helical condition-responsive member mounted in said casing and wound in a plurality of convolutions and having one end thereof fixed to said casing and the other end thereof free to rotate relative to said casing in response to a change in the condition which is to be indicated, (c) a second member adjustably threaded coaxially on said helical member adjacent said free end to adjust the deflection rate of said helical member, and to rotate with said helical member upon movement of said free end, (d) said second member having thereon at least part of a helical thread whose lead is different from the lead of said helical member, and which is threaded between the convolutions of said helical member frictionally to hold said second member in an adjusted position on said helical member, and (e) an indicating pointer connected to said second member and rotatable therewith to be readable against a plurality of graduations carried by said casing thereby to indicate movement of said helical member.

16. An indicating device as claimed in claim 15 wherein the lead of said helical thread is smaller than the lead of the convolutions of said helical member.

17. An indicating device as defined in claim 16 wherein said helical thread has a root diameter greater than the inside diameter of said helical member.

References Cited in the file of this patent

UNITED STATES PATENTS

| | | |
|---|---|---|
| 1,390,273 | Brown et al. | Sept. 13, 1921 |
| 2,340,958 | Hansen | Feb. 8, 1944 |